(12) United States Patent
Bluemel

(10) Patent No.: US 7,100,433 B2
(45) Date of Patent: Sep. 5, 2006

(54) VEHICLE WHEEL HAVING PRIMARY DETECTOR FUNCTION

(75) Inventor: Klaus Bluemel, Dinslaken (DE)

(73) Assignee: Thyssenkrupp Stahl AG, Duisburg (DE)

( * ) Notice: Subject to any disclaimer, the term of this patent is extended or adjusted under 35 U.S.C. 154(b) by 0 days.

(21) Appl. No.: 10/504,705

(22) PCT Filed: Feb. 14, 2003

(86) PCT No.: PCT/EP03/01470

§ 371 (c)(1),
(2), (4) Date: Mar. 13, 2005

(87) PCT Pub. No.: WO03/070489

PCT Pub. Date: Aug. 28, 2003

(65) Prior Publication Data

US 2005/0166669 A1    Aug. 4, 2005

(30) Foreign Application Priority Data

Feb. 22, 2002 (DE) .................. 102 07 374

(51) Int. Cl.
*G01M 17/02* (2006.01)
(52) U.S. Cl. .......................................... 73/146
(58) Field of Classification Search .......... 73/146, 73/146.2, 146.3, 146.5, 146.8
See application file for complete search history.

(56) References Cited

U.S. PATENT DOCUMENTS

| 4,570,152 | A | * | 2/1986 | Melton et al. ............... 340/449 |
| 5,895,854 | A | * | 4/1999 | Becherer et al. ......... 73/514.39 |
| 5,913,240 | A | | 6/1999 | Drahne et al. |
| 6,293,140 | B1 | | 9/2001 | Lohberg |

FOREIGN PATENT DOCUMENTS

| DE | 199 530 30 | 5/2001 |
| DE | 199 576 45 | 5/2001 |
| JP | 07280821 | 10/1995 |

\* cited by examiner

*Primary Examiner*—Edward Lefkowitz
*Assistant Examiner*—Andre Allen
(74) *Attorney, Agent, or Firm*—Proskauer Rose LLP

(57) ABSTRACT

The present invention relates to a wheel rim (1), having a wheel rim bed (1*a*), of a vehicle wheel having a detection system for a measurement device for detecting the rotational velocity of the vehicle wheel. The detection system comprises a marking (6), running around the circumference on the wheel rim bed (1*a*) or integrated therein, made of a track of marks (6*a*, 6*b*, 6*c*), which are implemented as a profile that stiffens the wheel rim bed (1*a*) and are detectable without contact to detect the rotational velocity when passing a sensor (7) of a measurement device to be positioned stationary next to the vehicle wheel.

5 Claims, 2 Drawing Sheets

VEHICLE WHEEL HAVING PRIMARY DETECTOR FUNCTION

BACKGROUND OF THE INVENTION

Monitoring systems for the rotational velocity of the wheels are included in the standard equipment of modern vehicles equipped with wheels, particularly those for personal conveyance. Of these systems, ABS (antilock braking system) is the most well-known. The functional capability of these and other systems is a function of the precision of the detection of the rotational velocity of the wheel within each rotation. In order to detect the rotational velocity as sensitively as possible, a measurement device for detecting the rotational velocity is known from practice, which has a disk, which is toothed, for example, rotating with the particular wheel and a fixed sensor, held on the brake caliper of a disk brake, for example, which detects the teeth and the gaps of the toothed disk without contact. The number of teeth and tooth gaps detected by the sensor at a specific rotational velocity is a function of the diameter of the disk and the teeth and tooth gaps placed around the circumference of the disk. For reasons of corrosion and contamination, the teeth may not be implemented as especially fine. The overall space in the wheel disk, which is already restricted by housing the brake disk with the brake caliper, also does not allow a large diameter of the toothed disk. For these reasons, the desired sensitivity in the detection of the rotational velocity of a vehicle wheel may not be achieved using the known technology.

In addition, detection systems for the rotational velocity of a vehicle wheel, operating without contact and comprising a track of marks in the form of magnetic elements positioned on a lateral flank of the tire of the vehicle wheel or on its wheel rim, which are moved past a stationary sensor of a measurement device when the vehicle wheel is rotated, are known from the patent literature (DE 196 20 581 A1; DE 198 53 696 A1). In this case, the magnetic elements are used exclusively to detect the rotational velocity of the vehicle wheel.

SUMMARY OF THE INVENTION

The present invention is based on the object of simplifying the construction of a sensitively reacting detection system for the rotational velocity of a vehicle wheel and making it more robust while incorporating its wheel rim.

This object is achieved using a wheel rim, having a wheel rim bed, for a vehicle wheel, in which a marking running around the circumference of the wheel rim bed is provided on the wheel rim bed or integrated therein, which is used for contactless detection of the rotational velocity when passing a sensor of a measurement device, positioned spatially next to the vehicle wheel and stationary in relation to its rotational motion, in that the marking comprises a track of marks which are implemented as a profile that stiffens the wheel rim bed.

In such a wheel rim of a vehicle wheel, which may have one or multiple parts and may be made of different materials, but is preferably made of steel, no additional elements which take up overall space are necessary to detect the rotational velocity of the wheel, because the wheel rim bed itself is provided with the marks. This also means that they are positioned on the largest possible circumference, with the effect that a large number of marks may be housed here without having to implement them as especially fine. Because of this comparatively coarse implementation of the marks, there is also no danger that they will lose their detectability because of contamination or other external influences. In comparison to the teeth in the known, exposed toothed disk, even during dismounting and in the dismounted state of the wheel, they are well protected from dirt and damage in its wheel disk. In addition, they have a stiffening effect, which allows lower wall thicknesses and therefore a lower weight at the same stiffness. This has a positive effect on the driving comfort in the unsprung mass of a vehicle wheel.

As in one of the known measurement devices for detecting the rotational velocity of a vehicle wheel, the sensor may also be carried by the brake caliper of a brake system in the object of the present invention.

According to one embodiment of the present invention, the marks positioned one behind another in the track may generate a signal sequence in the sensor which is a function of the running direction. For this purpose, they may be divided into uniform groups.

Optically, electrically, or magnetically detectable elements are suitable as marks. Optically detectable elements may be ribs, grooves, or beads. Amorphous, soft-magnetic alloys, such as metallic glasses, are suitable as the material for magnetically detectable elements. These elements are then attached to the profile.

Furthermore, the object of the present invention is a semi-finished product in the form of a sheet metal strip for manufacturing a wheel rim having a wheel rim bed for a vehicle wheel having one or a selection of the features described. In such a semi-finished product, the track of the marks extends in the lengthwise direction of the strip.

BRIEF DESCRIPTION OF THE DRAWINGS

In the following, the present invention will be explained in greater detail on the basis of a drawing which illustrates an exemplary embodiment.

DETAILED DESCRIPTION OF THE INVENTION

Figure 1:
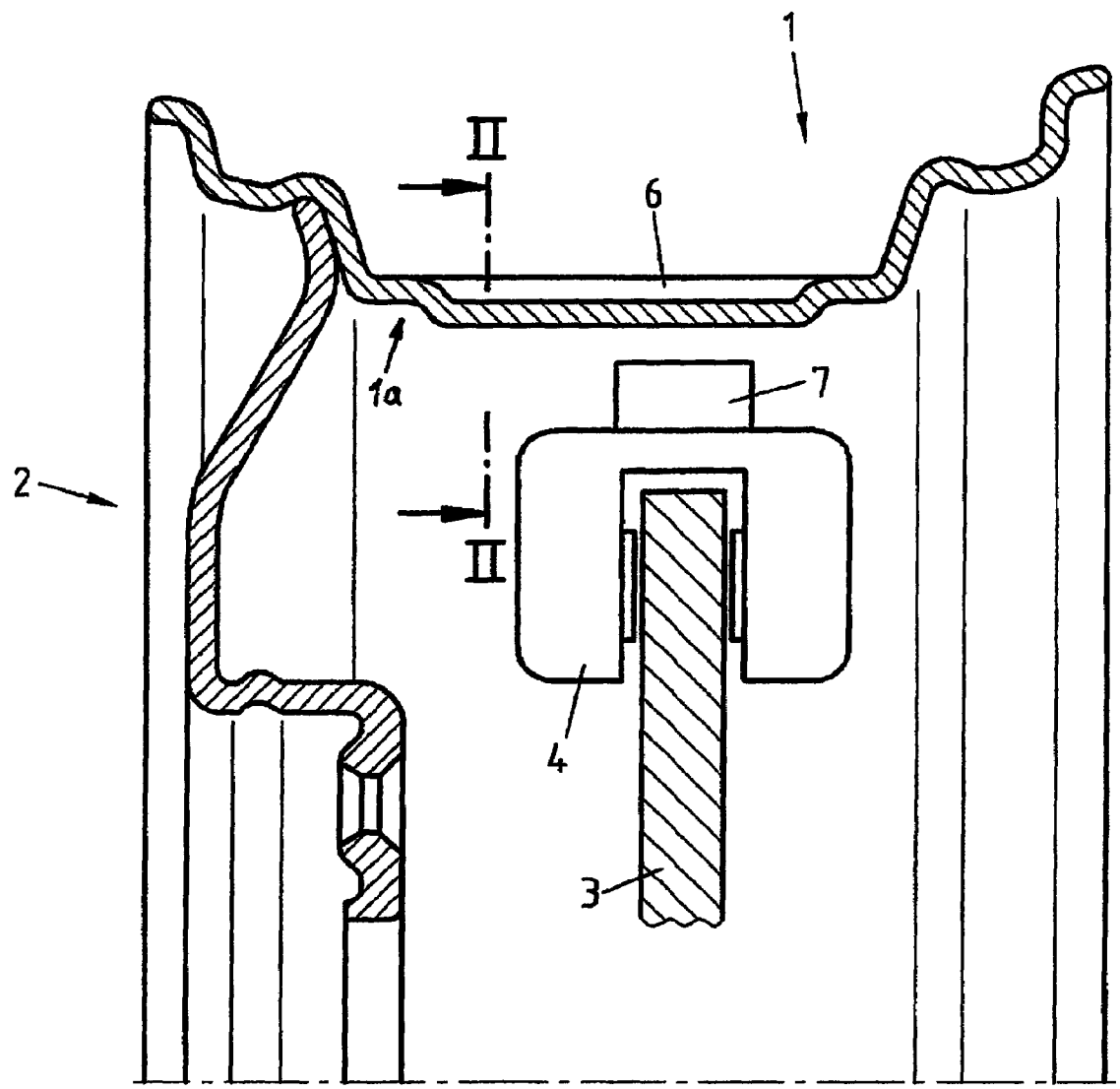
FIG. 1 shows a wheel rim of a vehicle wheel in partial section.
Figure 2:
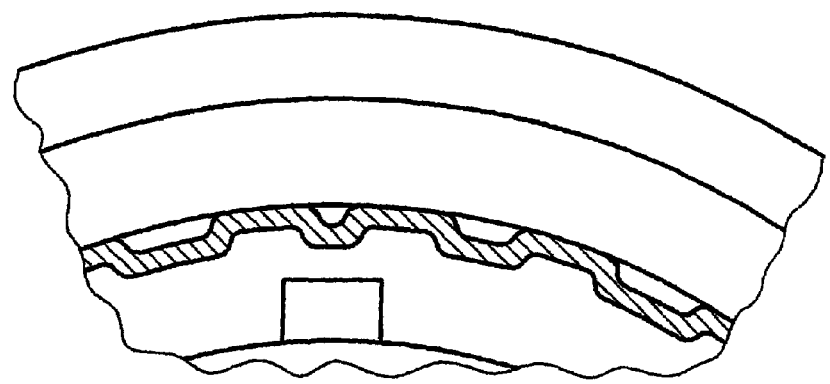
FIG. 2 shows the wheel rim in the partial section along line II-II of FIG. 1.
Figure 3:
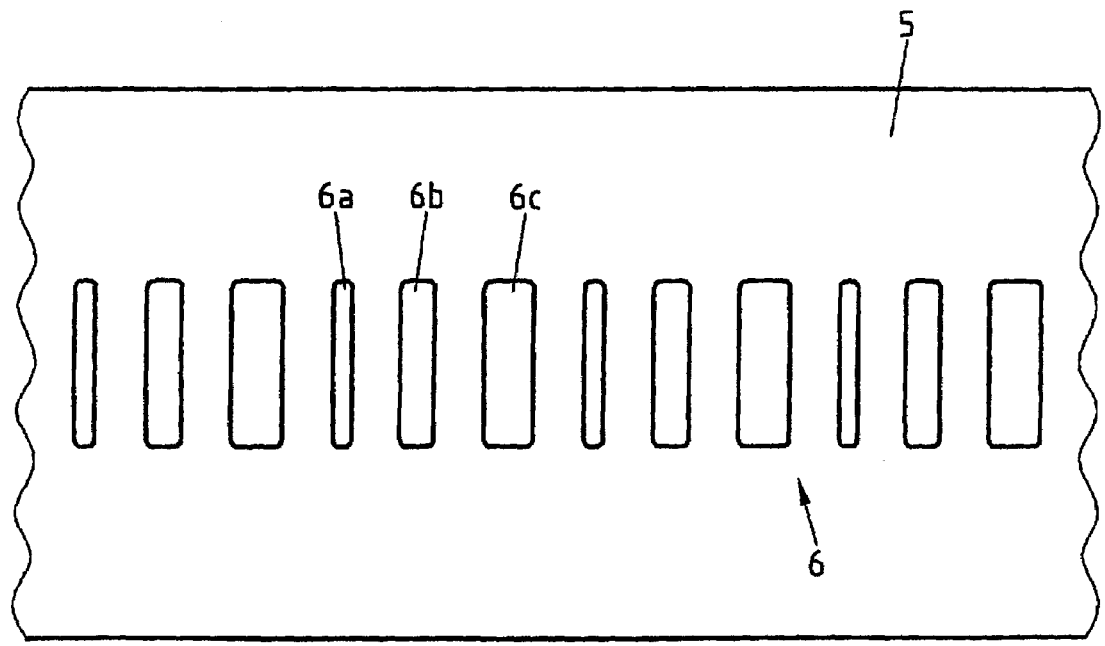
FIG. 3 shows a semi-finished product in the form of a profile sheet metal strip made of steel for manufacturing a wheel rim of a vehicle wheel as shown in FIG. 1.

The wheel rim 1, manufactured from sheet steel, of a vehicle wheel (not shown in its entirety) illustrated in FIG. 1 is connected by welding, for example, to a wheel disk 2. The wheel rim 1 has a wheel rim bed 1a. A brake disk 3, which rotates together with the vehicle wheel, and a brake caliper 4, which is positioned stationary in relation to the vehicle wheel, are provided in the overall space of the wheel disk 2 and under the wheel rim bed 1a.

The wheel rim 1 is manufactured from a flat sheet metal strip 5 made of steel, in which a track of marks 6a, 6b, 6c, which are embossed into the sheet metal strips as stiffening beads, is positioned in the metal as the marking 6. The marks 6a, 6b, 6c form repeating triplet groups of beads of different widths, whose average distance is equal. Such a sheet metal strip 5 may then be manufactured continuously. Sections cut to length therefrom may then be shaped into the wheel rim 1.

In the installed state of the vehicle wheel, the marking 6 having its triplet groups of marks 6a, 6b, 6c lies opposite a sensor 7 carried by the brake caliper 4. The marks 6a, 6b, 6c and the sensor 7 form a primary detector unit, which provides a pulse sequence for the marks 6a, 6b, 6c of different widths detected by the sensor 7 to a measurement device (not shown) to detect the rotational velocity. The measurement device determines the rotational velocity via the angle of rotation and/or the number of pulses per time unit. Using the measurement device, the rotational velocity and, in addition, the rotational direction of the vehicle wheel may be detected. To detect the rotational direction, it is important for the sequentially following pulses to differ from one another. This may be implemented, for example, in that the marks lying one behind another are themselves different, having different widths of grooves or beads, or the intervals of sequential marks are different.

The marks 6a, 6b, 6c may have different geometric shapes and may be implemented differently. The stiffening grooves or beads may also carry colored markings or reflecting elements. It is also possible, particularly in wheel rim beds made of steel, to implement them as magnetized regions. Both active and passive marks are conceivable.

The invention claimed is:

1. A wheel rim, having a wheel rim bed, for a vehicle wheel, in which a marking, which runs around the circumference of the wheel rim bed, is provided on the wheel rim bed or integrated therein, which is used for contactless detection of the rotational velocity when passing a sensor of a measurement device, which is positioned spatially next to the vehicle wheel and stationary in relation to its rotational movement, wherein the marking comprises a track of marks, which is implemented as a profile that stiffens the wheel rim bed.

2. The wheel rim according to claim 1, wherein the marks, positioned one behind another in the track, generate a signal sequence in the sensor which is a function of the running direction.

3. The wheel rim according to claim 1, wherein the marks are divided into uniform groups.

4. The wheel rim according to claim 1, wherein the marks, which form a primary detector unit with the sensor, are optically, magnetically, or electrically detectable elements.

5. A semi-finished product in the form of a sheet metal strip made of steel for manufacturing a wheel rim, having a wheel rim bed, for a vehicle wheel according to claim 1, in which the track of the marks extends in the longitudinal direction of the strip.

* * * * *